United States Patent [19]

Boggs et al.

[11] 4,099,024
[45] Jul. 4, 1978

[54] COMMUNICATIONS NETWORK REPEATER

[75] Inventors: David R. Boggs, Los Altos Hills; Robert M. Metcalfe, Palo Alto, both of Calif.

[73] Assignee: Xerox Corporation, Stamford, Conn.

[21] Appl. No.: 769,141

[22] Filed: Feb. 16, 1977

[51] Int. Cl.² .......................................... H04L 25/40
[52] U.S. Cl. .................................................... 178/71 R
[58] Field of Search .................. 178/71 R, 70 R, 73, 178/58 R, 58 A; 340/346

[56] References Cited

U.S. PATENT DOCUMENTS 3,673,326  6/1972  Lee ..................................... 178/71 R

*Primary Examiner*—Thomas A. Robinson
*Attorney, Agent, or Firm*—Irving Keschner; Barry Paul Smith

[57] ABSTRACT

A repeater is provided for use in a communications network which includes a plurality of transceivers, the repeater being bidirectional and allowing the interconnection of two segments of the network and also allowing longer communications networks to be used by matching or amplifying the signal level of an incoming information packet on one segment and coupling the matched or amplified signal to a succeeding segment. The repeater has two ports that preferably utilize two semiconductor chips, each port having a carrier one-shot which detects the presence of an information packet arriving at that port. If an incoming port's one-shot is triggered by an incoming packet of information, the carrier one-shot for the repeating port and the incoming port transmitter are disabled. If the transceiver coupled to the repeating port detects a collision, this information is fed back to the incoming port which enables the incoming port transmitter thereby causing a collision on the incoming network segment which causes the termination of the transmission of the data packet by a using device already transmitting.

4 Claims, 2 Drawing Figures

4,099,024

COMMUNICATIONS NETWORK REPEATER

BACKGROUND OF THE INVENTION

A multiaccess communication system without a central control device (i.e. distributed control) is disclosed in copending application Ser. No. 563,741, filed Mar. 31, 1975 and assigned to the assignee of the present invention. The system includes a plurality of transceivers connected to the communicating medium utilized in the system, each transceiver including transmitting apparatus for transmitting a signal onto the medium and receiving apparatus for receiving a signal onto the medium and receiving apparatus for receiving a signal communicated on the medium by another transceiver. Each transceiver includes a collision detector for generating a collision signal whenever a signal communicated in the medium from another transceiver is received during the time the transceiver is transmitting a signal onto the medium, the collision signal causing the interruption of the transmission of a signal onto the medium by the using device connected to the transceiver.

The network comprises sections of a coaxial cable such as disclosed in the copending application or could be any suitable medium such as fiber optic cable, radio channel or coaxial cable, etc. Since any medium includes losses, and since segments thereof may extend over large geographic ranges, various losses occur, and for that reason sections of the network are tied across repeaters.

Reference to repeaters in the aforementioned application was made for purposes of completing the embodiment since they are not necessary to practice the invention disclosed therein where short communication links are contemplated and line losses are taken out by selective design of the medium and the transceiver. However, in specific applications wherein large communication links are contemplated and selective design of the medium and transceiver cannot compensate for line losses, repeaters generally are required.

Since the system described in the aforementioned copending application is bidirectional in nature i.e., there being packets of information flowing in both directions on the cable which may arrive at the transceiver of a using device from either direction, a repeater for use in such system must be capable of bidirectional operation i.e., the repeater preferably will determine in which direction to repeat the information packet without external control. Further, the repeater, which has an incoming and repeating port, should be capable of responding to the detection of a collision by a transceiver at the repeating port and pass the occurrence of the collision back onto the incoming segment via the incoming port transceiver transmitter and cause the using device already transmitting the data packet to cease transmission.

SUMMARY OF THE PRESENT INVENTION

The present invention provides a bidirectional repeater for use in a communicating network or medium which includes a plurality of transceivers, the repeater being bidirectional and allowing the interconnection of two segments of the network and also allowing longer communicating networks to be used by matching or amplifying the signal level of an incoming information packet on one segment and coupling the matched or amplified signal to a succeeding segment. The repeater has two ports that preferably utilize two semi-conductor chips, each port having a "carrier" one-shot which detects the presence of a packet at that port. If an incoming port's one-shot is triggered by an incoming packet of information, the carrier one-shot for the repeating port and the incoming port transmitter are disabled. If the transceiver coupled to the repeating port detects a collision, this information is fed back to the incoming port which enables the incoming port transmitter causing a collision on the incoming segment and causing the termination of the transmission of the data packet by a using device already transmitting.

It is an object of the present invention to provide a repeater for use in a communications network.

It is a further object of the present invention to provide a bidirectional repeater for use in a communications network.

It is still a further object of the present invention to provide a bidirectional repeater for use in a communications network wherein the repeater determines the direction of flow of data without the use of external control.

It is a further object of the present invention to provide a bidirectional repeater for use in a multiaccess communications system without central control.

It is a further object of the present invention to provide a bidirectional repeater which, upon detecting a collision at the repeating port, passes the collision back onto the incoming port segment of the network causing the termination of the transmission of the packet by a using device already transmitting.

DESCRIPTION OF THE PREFERRED EMBODIMENT

Since the present invention is directed to a repeater which is particularly adapted for use in a multi-access communications system without central control as described in copending application Ser. No. 563,741, filed Mar. 31, 1975, the repeater will be described in the environment disclosed, including terminology and definitions utilized therein, in the copending application and the teachings therein necessary for an understanding of the present invention are incorporated herein by reference.

Figure 1:
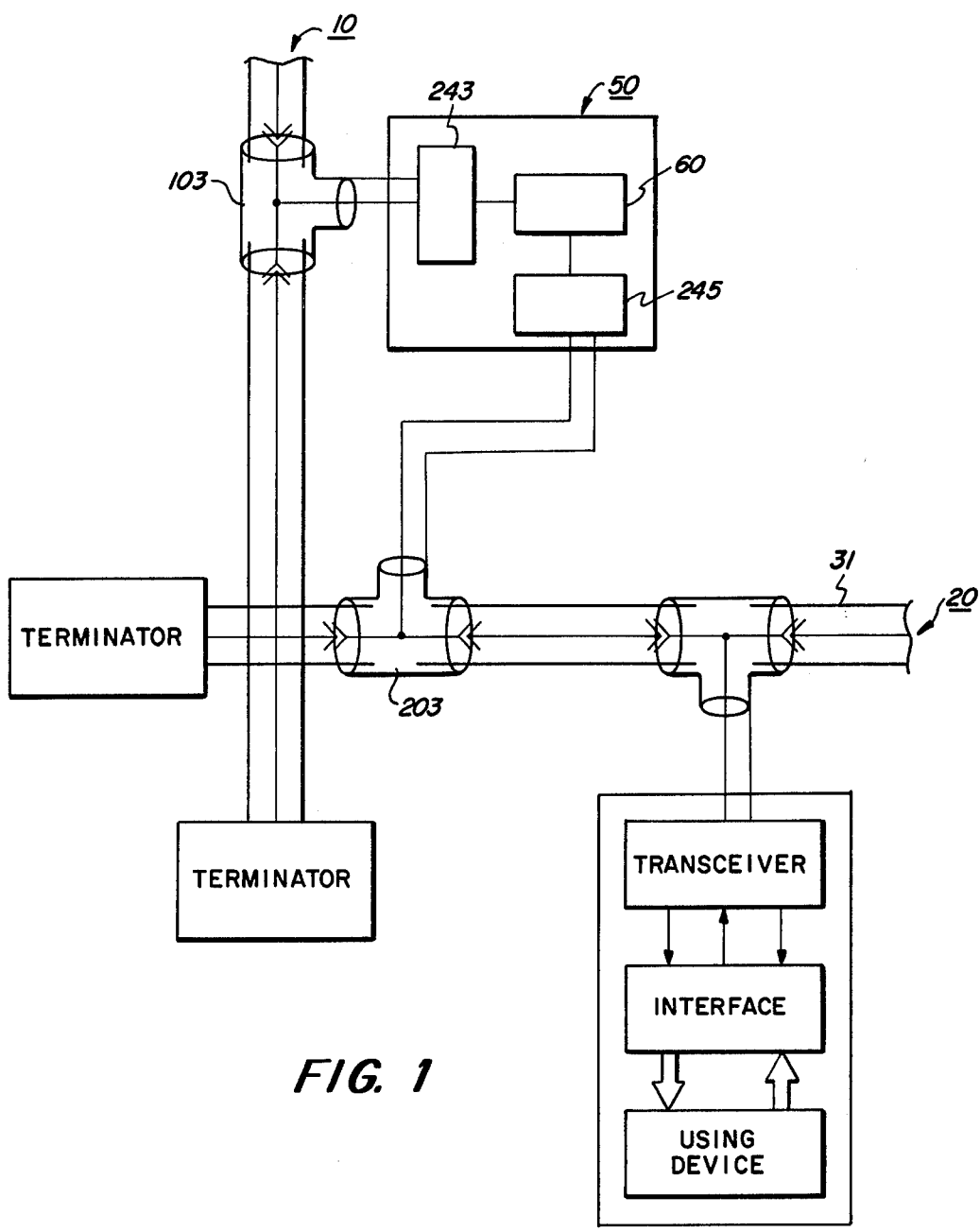
FIG. 1 shows a portion of the system disclosed in the above-identified copending application which requires the use of a repeater.

As shown in FIG. 1, proximate the intersection of cables 10 and 20 (communication medium) there is a repeater circuit generally designated by the numeral 50 communicating on one side between a tap 103 on cable 10 and a tap 203 on cable 20. On the interior of the repeater 50, the cable 10 via tap 103 is tied to a transceiver 243, across a repeater logic section 60 to a transceiver 245 which then connects to cable 20 by way of a tap 203. In this manner, an extended network is formed in which two network segments, or cables 10 and 20, are tied together across repeater 50 which matches up the signals between the cables. It should be noted that in addition to matching signals between cables, the repeater logic 60 may include amplifying means if the selected interconnection points on cables 10 and 20 are sufficiently far from the source of a data packet so that the data packet input to the transceiver has lost sufficient strength to require amplification. For the repeater logic described hereinafter with reference to FIG. 2, it will be assumed that the transceivers 245 and 243 accomplish the amplification.

The specific description of the transceivers 243 and 245 are set forth in the copending application. For purposes of this disclosure it is sufficient to note that the transceiver is capable of receiving an input signal, (data packet), amplifying it if necessary, transmitting an output signal (data packet) and generating a signal indicating that a data collision (data packets from two different sources are being transmitted and received substantially simultaneously by the transceiver) has occurred.

Figure 2:
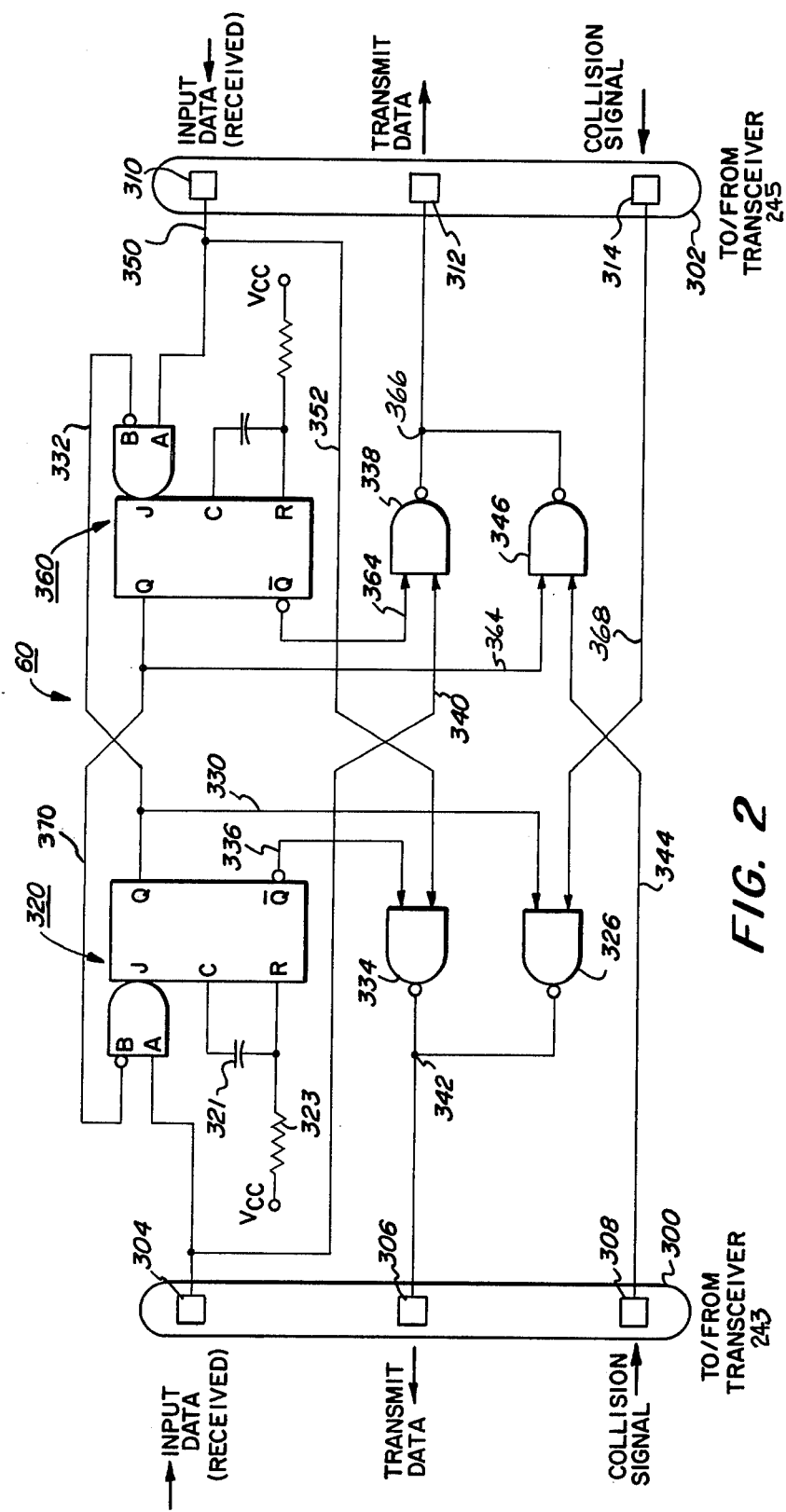
FIG. 2 shows schematically the repeater logic of the present invention.

Referring now to FIG. 2, elements 300 and 302 are schematic representations of the connections between transceivers 243 and 245 respectively, and repeater logic 60 and will be referred to hereinafter as the incoming and repeating ports, respectively, for transmission of data packets from left to right as viewed from the figure. Obviously, if transmission was in the reverse direction, element 300 would act as the repeating port and element 302 the incoming port. Incoming port 300 includes input data port 304, transmit data port 306 and collision signal port 308, while repeater port 302 includes input data port 310, transmit data port 312 and collision signal port 314. Input data port 304 is connected to the "A" input of one-shot multivibrator 320 which may comprise Texas Instruments device SN 74123. The capacitor 321, resistor 323 and potential source Vcc shown are utilized to determine the time duration of the active state of the one-shot multivibrator 320 and should be set to about ½ of the bit times of the incoming data if the incoming data is phase encoded as set forth in the copending patent application. The Q output of multivibrator 320 is coupled to one input of NAND gate 326 and to the inverting or "B" input of one-shot 360 via leads 330 and 332, respectively. The inverted or $\overline{Q}$ output of one-shot 320 is coupled to one input of NAND gate 334 via lead 336. The input data packet received at input data port 304 is also applied to one input of NAND gate 338 via lead 340. The output of NAND gates 326 and 334 are wired "ORed" together at point 342 and coupled to the transmit data port 306. A collision signal applied to the port 308 by transceiver 243 is coupled via lead 344 to one input of NAND gate 346.

Referring to the symmetrical right hand portion of the schematic diagram, input data received at the input data port 310 is coupled to the "A" input of one-shot 360 via lead 350, the received data packet also being coupled to the other input of NAND gate 334 via lead 352. One-shot multivibrator 360 is identical in configuration and operation to one-shot multivibrator 320. The one-shot multivibrators 320 and 360 may comprise chips made by Texas Instruments Corporation (TIC) Model No. 74123 as set forth hereinabove and NAND gates 334, 326, 338 and 346 may comprise TIC chips 7438. The Q output of one-shot 360 is coupled to one input of NAND gate 346 via lead 364 and the $\overline{Q}$ output of one-shot 360 is coupled to the other input of NAND gate 338 via lead 364. The output of NAND gates 338 and 346 are wired "ORed" together at point 366 and coupled to the transmit data port 312. The output from collision signal port 308 is applied to the other input of NAND gate 346 via lead 344, the collision signal input applied to port 314 by transceiver 245 being applied to the other input of NAND gate 326 via lead 368. The Q output of one-shot 360 is coupled to the other or "B" input of one-shot 320 via lead 370. As indicated, the connectors 300 and 302 (or incoming and repeater ports, respectively, in the left to right mode of operation) are coupled to respective transceivers (not shown) 243 and 245 of the type described in the aforementioned copending patent application. One-shot multivibrators 320 and 360 may be referred to as "carrier detectors" (an analogy to radio communications) since they monitor or detect incoming data packets coupled to their respective connectors 300 and 302 by transceivers 243 and 245, respectively.

In operation, it is assumed that a data packet is being repeated from cable 10 via transceiver 243 to repeater 60 and hence to cable 20 via transceiver 245. If repeater 60 is going to repeat a signal from cable 10 to cable 20, a data packet is received at data port 304 of incoming port 300 from transceiver 243 and applied to one input of carrier detector 320 and one input of NAND gate 338 via lead 340, the output of NAND gate 338 being coupled to transmit data port 312 of repeating port 302 and then to transceiver 245. Similarly, if a data packet is to be repeated from cable 20 to cable 10, the signal would be received by transceiver 245 and applied to one input of carrier detector 360 and via NAND gate 334 to transmit data port 306 and thence to transceiver 243. Since both halves of the repeater shown operate essentially the same, only the transmission of a data packet from transceiver 243 to transceiver 245 will be described in detail. The leading bit of a packet (and subsequent bit-transitions within the packet) causes the Q output of carrier detector 320 to go true (logic "1") and disables carrier detector 360 holding its $\overline{Q}$ output true. That $\overline{Q}$ output of carrier detector 360 is applied to one input of NAND gate 338 which allows the data packet applied to port 304 to be repeated at port 312 (transmit data ports use "0" logic to enable the transmit inputs of their associated transceivers). Note that carrier detector 360 must be disabled to prevent it from being triggered by the incoming data from transceiver 245 which will be a copy of the data being transmitted to that transceiver, a characteristic of the particular transceiver design set forth in the aforementioned copending patent application. The $\overline{Q}$ output of carrier detector 320 will be false (logic "0") and is applied to the input of NAND gate 334 via lead 336 to disable the transmit data port 306. This is necessary because as mentioned above, transceiver 245 will be supplying as input data at port 310, a copy of the data packet being transmitted at transmit port 312.

If the data packet applied to transmit data port 312 is transmitted substantially simultaneously with a data packet from some other using device on cable 20, a collision is detected by transceiver 245 and a collision signal is applied to port 314 and thence to NAND gate 326 via lead 368. It should be noted that the outputs of NAND gates 326 and 334 are joined at point 342 in a "wired" OR configuration. Since a logic "1" input is now applied to gate 326 via lead 368 along with the logic "1" input on lead 330, NAND gate 326 applies a "0" logic signal to transmit data port 306 via wired OR 342, causing a signal to exist on the transmitter line of transceiver 243. A signal is therefore transmitted to network segment 10 connected to transceiver 243 causing a deliberate collision to be created with the using device already transmitting on segment 10 and causing that using device to terminate its transmission (see the description of the transceiver operation in the aforementioned copending patent application).

The bidirectional feature of repeater 60 is clearly observed from the operation thereof as described hereinabove. If a data packet is first received at input data port 304, the data packet is repeated at port 312 (i.e. from left to right as viewed from the drawing). If a data packet is first received at input data port 310, the data packet is repeated at port 306 (right to left as viewed from the drawing). If a data collision is detected at repeating port 314 the transmit data port 306 at incoming port 300 causes the transceiver coupled thereto to create a collision on the connected network whereby the using device already transmitting on the network terminates transmission. It should be noted that the transceiver itself does not cease the transmission when it detects a collision, rather, the collision signal causes the using device connected to the transceiver to stop sending bits to the transceiver.

While the invention has been described with reference to its preferred embodiment, it will be understood by those skilled in the art that various changes may be made and equivalents may be substituted for elements thereof not departing from the true spirit and scope of the invention. In addition, many modifications may be made to adapt a particular situation or material to the teaching of the invention without departing from its essential teachings.

What is claimed is:

1. A repeater for use in a data communication system of the type comprising a communicating medium, a plurality of transceivers connected to the medium, each transceiver capable of transmitting data onto the medium, receiving data communicated on the medium by another transceiver, and generating a collision signal whenever data communicated on the medium by another transceiver is received by the transceiver during the time the transceiver is transmitting data onto the medium, said repeater comprising:
   a first port connected to a first one of said transceivers for receiving data communicated on the medium and received by said first transceiver;
   a second port connected to said first transceiver for receiving collision signals generated by said first transceiver;
   a third port connected to a second one of said transceivers for applying data and collision signals to said second transceiver for transmission thereby onto the medium;
   first means for coupling data from said first port to said third port; and
   second means for coupling collision signals from said second port to said third port.

2. The repeater of claim 1, further comprising:
   a fourth port connected to said second transceiver for receiving data communicated on the medium and received by said second transceiver;
   a fifth port connected to said second transceiver for receiving collision signals generated by said second transceiver;
   a sixth port connected to said first transceiver for applying data and collision signals to said first transceiver for transmission thereby onto the medium;
   third means for coupling data from said fourth port to said sixth port; and
   fourth means for coupling collision signals from said fifth port to said sixth port.

3. The repeater of claim 2, further comprising means for disabling said third means in response to receipt of data at said first port.

4. The repeater of claim 3, further comprising means for disabling said first means in response to receipt of data at said fourth port.

* * * * *